(12) United States Patent  (10) Patent No.: US 6,546,179 B2
Petri  (45) Date of Patent: Apr. 8, 2003

(54) GUIDE FOR ROUTING CABLES THROUGH PANEL OPENINGS

(76) Inventor: Hector D. Petri, 384 Edmands Rd., Framingham, MA (US) 01701

( * ) Notice: Subject to any disclaimer, the term of this patent is extended or adjusted under 35 U.S.C. 154(b) by 0 days.

(21) Appl. No.: 09/771,211

(22) Filed: Jan. 25, 2001

(65) Prior Publication Data

US 2002/0097973 A1 Jul. 25, 2002

(51) Int. Cl.⁷ .................................................. G02B 6/00
(52) U.S. Cl. ...................................... 385/134; 385/135
(58) Field of Search ............................... 385/134, 135, 385/136, 137; 174/68.3, 97

(56) References Cited

U.S. PATENT DOCUMENTS

| | | | | |
|---|---|---|---|---|
| 4,219,064 A | * | 8/1980 | Lozano | 411/103 |
| 5,100,221 A | * | 3/1992 | Carney et al. | 385/135 |
| 5,724,469 A | * | 3/1998 | Orlando | 385/135 |
| 2001/0032727 A1 | * | 10/2001 | Maynard et al. | 174/65 G |
| 2001/0036351 A1 | * | 11/2001 | Fritz | 385/135 |

* cited by examiner

*Primary Examiner*—Lynn D. Feild
*Assistant Examiner*—Chandrika Prasad
(74) *Attorney, Agent, or Firm*—John E. Toupal; Harold G. Jarcho

(57) ABSTRACT

An optic cable guide securable to a housing panel and having a guide surface with a radius of curvature to restrict cable bends and projecting over a hole in the panel through which cables pass or alternatively securable to an inner surface of the panel for routing cables within the housing.

21 Claims, 11 Drawing Sheets

GUIDE FOR ROUTING CABLES THROUGH PANEL OPENINGS

FIELD OF THE INVENTION

The present invention is related to the protection and guidance of optical fiber cables. More specifically, the invention is a device for retaining the bend of one or more optical fiber cables at a safely large radius while guiding them through a hole in a panel, while routing them along the surface of a panel, or while storing them on a panel. It has a particular application in the telecommunications industry.

BACKGROUND OF THE INVENTION

Fiber optic cables that are routed to and within equipment must be protected from being bent too sharply as might occur at sharp corners and edges or when excess cable is hanked for storage. Such sharp bending can cause cable fibers to be physically damaged by overstressing, and can cause functional failure of the fibers by changing internal optical properties at those bends. Specifically, loss of proper internal reflection of light traveling through the fiber as it reaches the overly sharp bend will be realized. It is therefore advantageous to keep a cable from being bent below its minimum bend radius even temporarily while installing and storing cable, and to provide some physical support to limit the bend radius during use.

One common method to avoid sharp bends is to spirally wrap cables around cylindrical tubing of a sufficient outside diameter, which tubing is then routed along the intended path of the optical cable. Although this method does ensure that the cable bend will never be sharper than the tubing's outside diameter, installing the tubing with the spirally wrapped cable is a tedious process. It is also expensive to tubing along the entire length of the cable's pathway just to ensure a sufficient radius only at the bend locations.

Some devices that support cable around curved surfaces only locally at the bend locations are known and include, for example, those shown in U.S. Pat. Nos. D427,897; 5,530,787; 5,724,469; 5,917,982; 5,937,131; 5,946,440; 5,995,699; 6,002,089; and 6,049,040. Such devices can be attached to panels along the intended route of the trays, but are only designed to address guiding of cable along its route or the storage of excess cable in a hank. It is therefore desirable to provide a singular device for retaining the bend of one or more optical fiber cables at a safely large radius either while guiding them through a hole in a panel, while routing them along the surface of a panel, or while storing them on a panel.

An additional problem faced when routing fiber optic cables through holes in panels is that the edges of such holes are often sharp or jagged. These edges can cause damage to or cut through the cable. It is therefore desirable to provide a means for protecting the cable from contact with the hole edge.

SUMMARY AND OBJECTS OF THE INVENTION

The present invention is a device for fixing to a panel or such and having a curved surface with a radius of curvature that is larger than the specified minimum bend radius for fiber optic cable. The device is adapted to support cables as they meander between and within equipment, whether on or through panel surfaces, while retaining the bend of the cables at a safely large radius.

In addition to including means for being affixed to the panel, the invention further includes means for covering the hole's edge. This is particularly useful in that it protects the cable from the usually sharp hole edge while guiding the cable through the hole.

The device is also adapted for providing a spool for storing excess cable, when four of the devices are provided and affixed to the panel, arranged in rectangular fashion. This ensures that the stored coil of excess cable cannot be bent sharper than the specified minimum bend radius for the cable.

Additionally, the invention is adapted to grasp the edges of panel holes and to grasp certain walls protruding from panels so that fasteners are not required. This feature allows for easier, faster, and more reliable assembly to the panel while reducing part count in most cases.

It is therefore an object of the present invention to provide an improved device for protecting, supporting and guiding fiber optic cable.

It is a further object to provide such a device which supports cable as it runs along panel surfaces and through panel holes.

It is a further object to provide such a device that is adaptable to form a cable storage spool.

It is a further object to provide such a device that protects cable that is routed through sharp edged panel holes from those sharp edges.

It is a further object to provide such a device that can be affixed to panels and panel holes without auxiliary fasteners.

Further objects and advantages of the present invention will become apparent upon review of the following description of the preferred embodiment and accompanying drawings thereof.

BRIEF DESCRIPTION OF THE DRAWINGS

These and other objects and features of the invention will become more apparent upon a perusal of the following description taken in conjunction with the accompanying drawings wherein.

DETAILED DESCRIPTION OF THE PREFERRED EMBODIMENT

Figure 1:
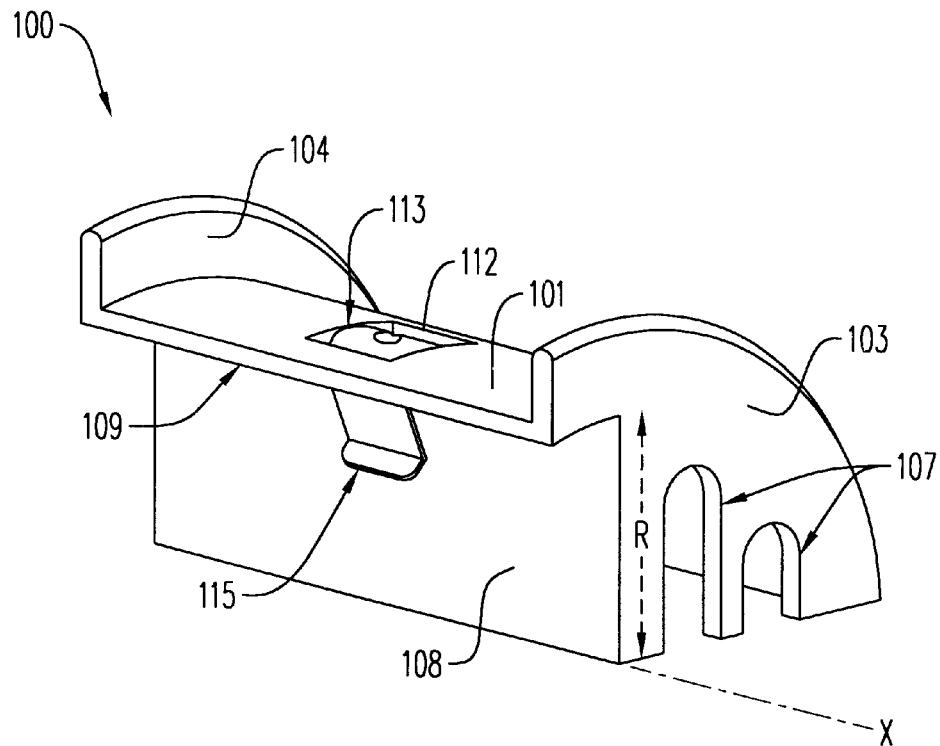
FIG. 1 is a perspective view of a guide according to the preferred embodiment of the invention.
Figure 2:
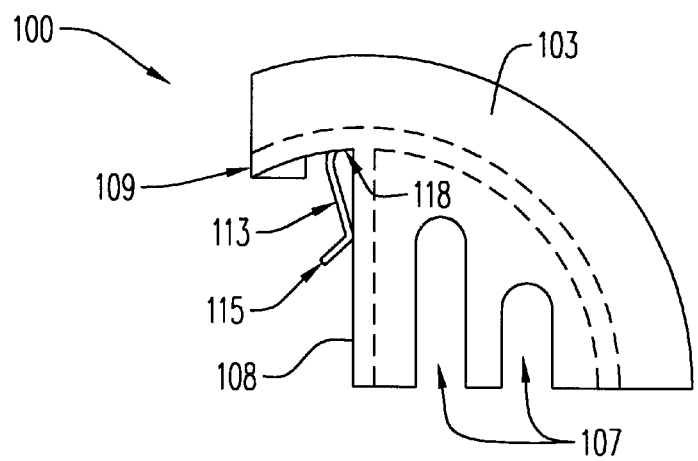
FIG. 2 is a side view of the guide of FIG. 1.
Figure 3:
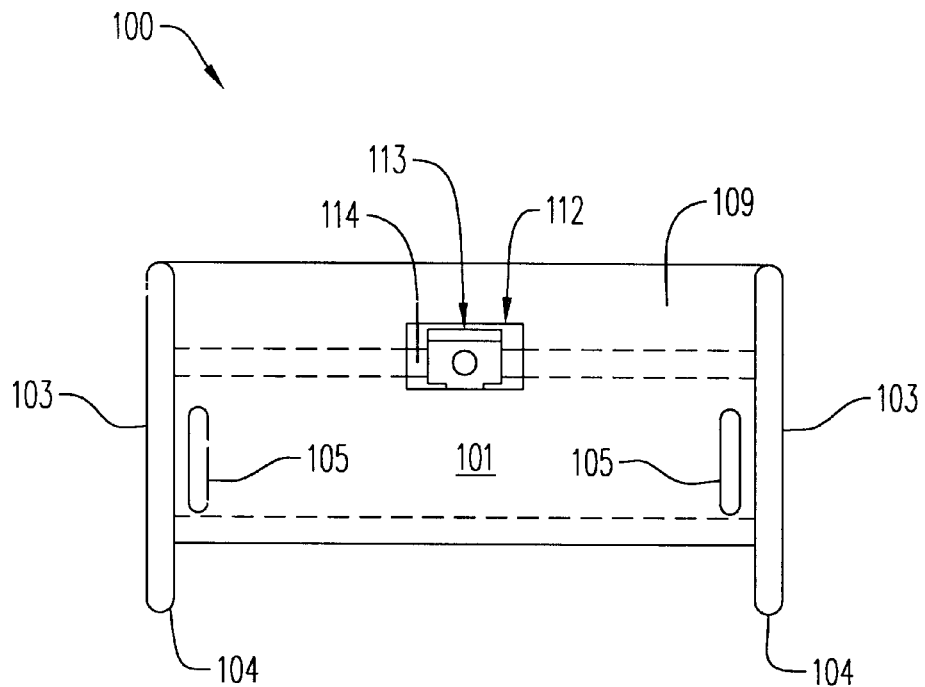
FIG. 3 is a top view of the guide of FIG. 1.
Figure 4:
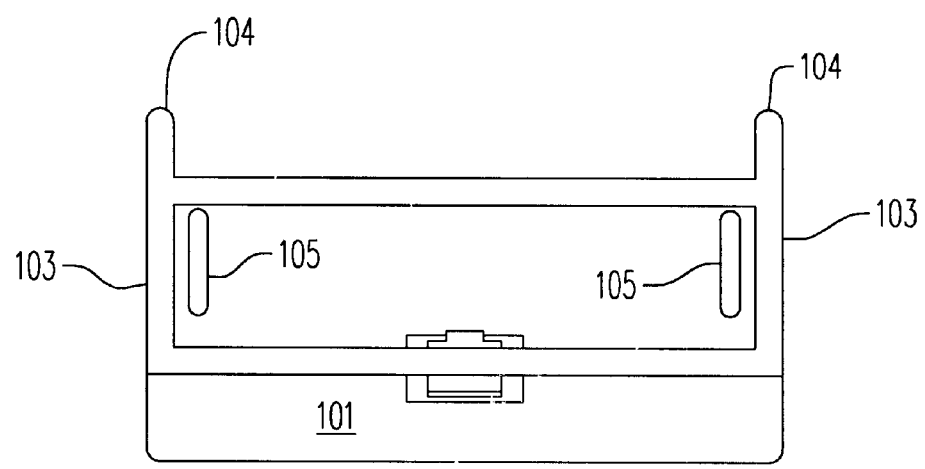
FIG. 4 is an end view of the guide of FIG. 1.

An optical fiber cable guide 100 according to the preferred embodiment of the present invention is depicted in FIGS. 1 through 7 and described herein. The guide is a singular component integrally molded of polycarbonate or an equivalent material.

Quarter-cylindrically curved guide surface 101 has a radius of curvature of one inch. This radius is sufficiently large to that fiber optic cables are not bent too sharply when supported there-around as in FIGS. 8 through 10. The quartercylinder of the guide surface is terminated at both ends by end walls 103, which extend inwardly towards the cylinder's imaginary axis and extend radially beyond the cylinder to provide arcuate flanges 104 that serve to retain the cable on the guide surface. Two slots 105 pass through the guide surface, each toward an opposite end thereof, through which a tie wrap or such (not shown) can be passed to secure cable against the guide surface.

The end walls include screw slots 107. Front wall 108 extends longitudinally and connects the cylinder axis to the guide surface. The cylindrical curve of the guide surface and the arcuate flanges of the end cap extend beyond the front wall to form a protective lip 109 that runs longitudinally for the length of the guide.

A slot 112 is molded through the cylindrical guide surface and is centrally positioned longitudinally and co-planar with the front wall. This slot is large enough to allow a clip 113, preferably made of steel, to pass therethrough and grasp the front wall at its upper edge 114.

The clip is a U-shaped spring with a lead-in tip 115 that causes the clip to spread as it is forced over the front wall edge so that the clip grasps the front wall firmly. The resiliency of the steel spring allows the clip to be spread a bit further apart without yielding, as required for the clip to grasp the edge of a panel hole as in FIG. 5 or a panel tab as in FIG. 6.

The guide is offered in several models, each identical except that the length of the guide surface in each has a different length to support a different number of cables.

Figure 5:
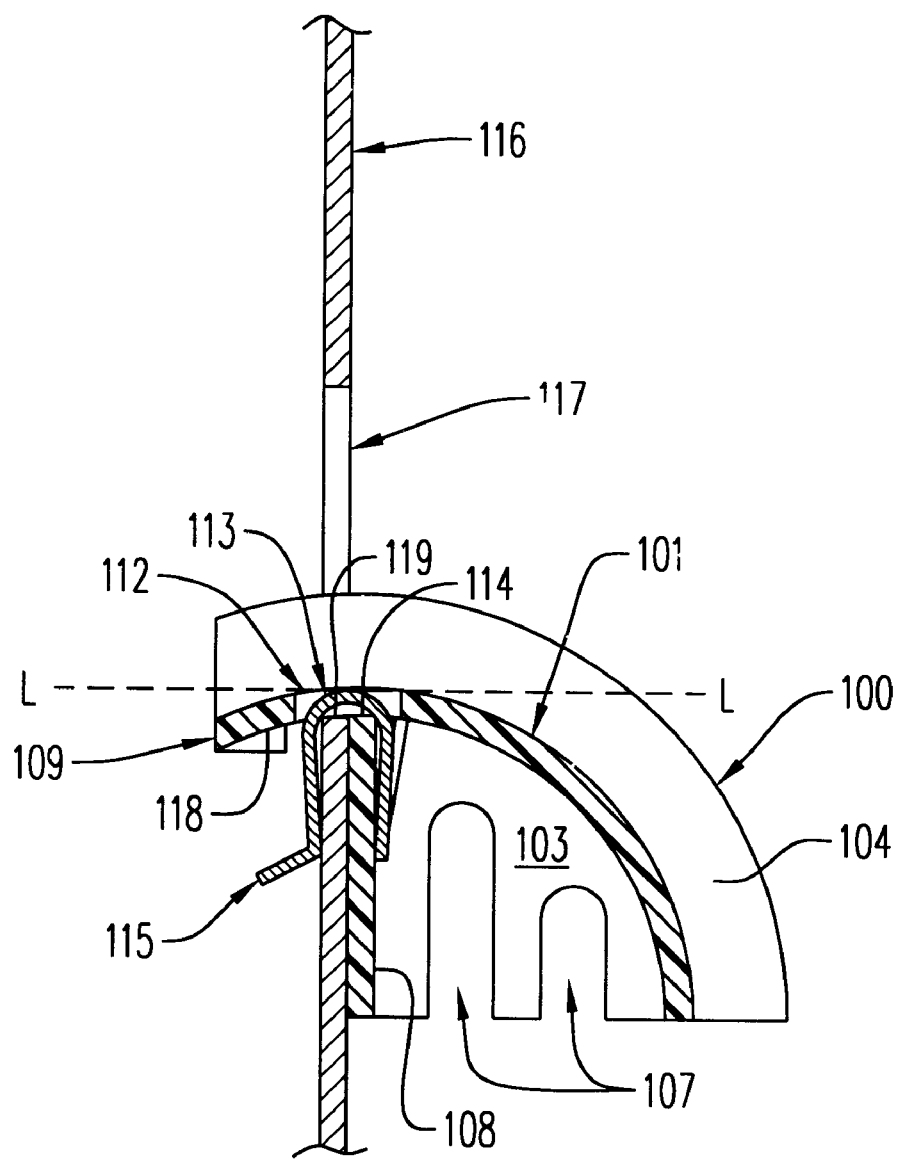
FIG. 5 is a cross-sectional side view of the guide of FIG. 1 shown affixed by means of the clip to a panel hole.

In FIG. 5, a sheet metal panel 116 is provided through which a rectangular hole 117 has been punched. The length and height of the hole are large enough to allow the guide's protective lip and the clip to pass therethrough. Then, the guide is lowered while the clip's lead-in engages the hole edge and causes the clip to spread over the edge. The guide is further lowered until the inside 118 of the guide's cylindrical surface rests on the lowermost edge 119 of the hole and the clip grasps that edge firmly to secure the guide to the panel. As shown, the radially directed wall 108 engages the panel 116 such that the guide surface 101 is tangent to a line L normal to the panel and the guide's axis of curvature X (FIG. 1) and radius of curvature lie in planes parallel to the panel. The spring characteristics of the clip are optimized for maximum holding force without yielding when the clip is spread to this condition.

Figure 8:
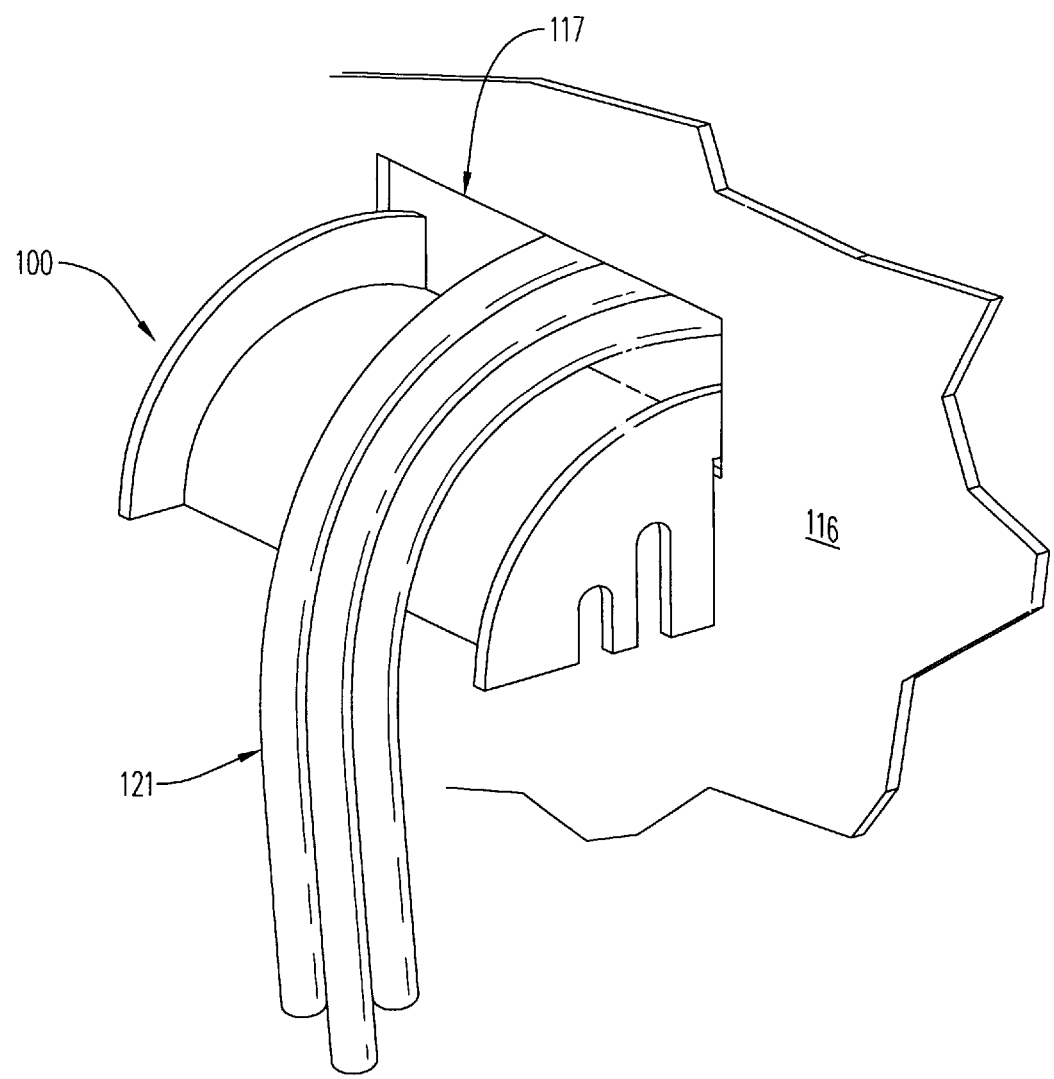
FIG. 8 is a perspective view of the guide of FIG. 1 attached to a panel hole and supporting several cables that are routed through the hole.

As shown in FIG. 8, cables 121, having a specified minimum bend radius of less than one inch, are routed from below the hole. They cannot be bent so sharply as they are routed into and through the hole as to damage them or their optical performance, because the curvature of the cylindrical guide surface defines the sharpest bend radius possible for the guide to be larger than the cable's minimum bend radius. Further, the protective lip of the guide extends over the sharp hole edge and protects the cable from being frayed or cut.

Figure 6:
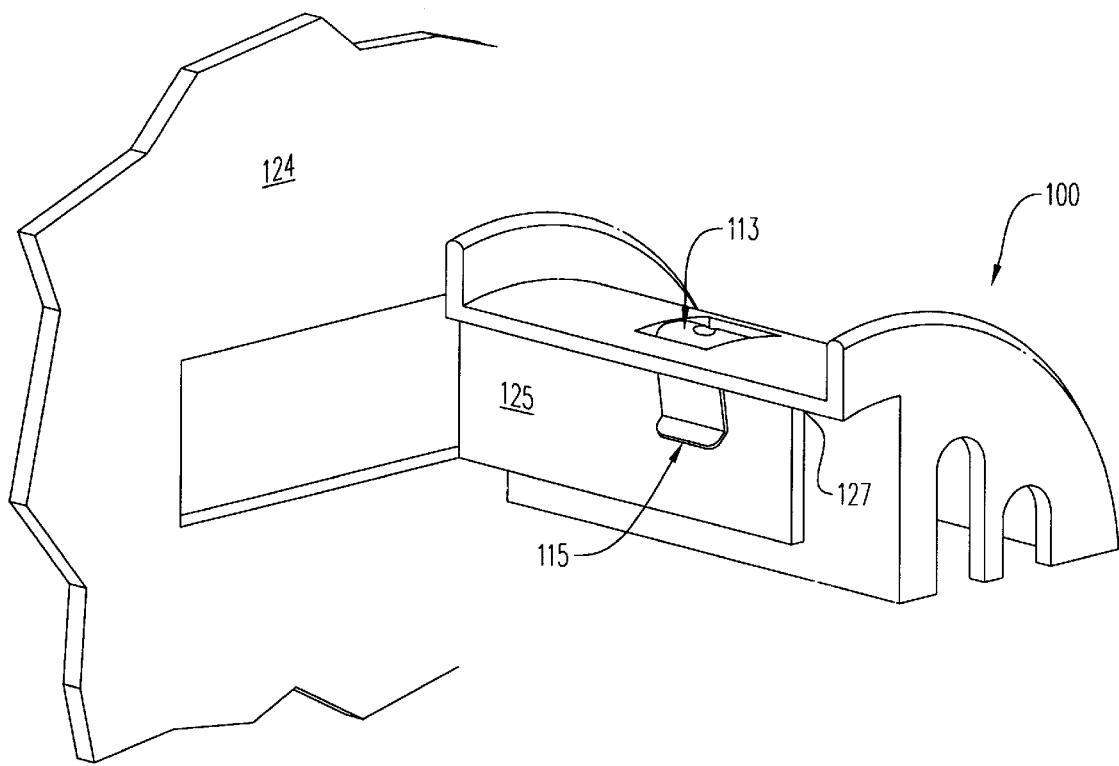
FIG. 6 is a perspective view of a guide of FIG. 1 shown affixed by means of the clip to a flange which protrudes from a panel.
Figure 9:
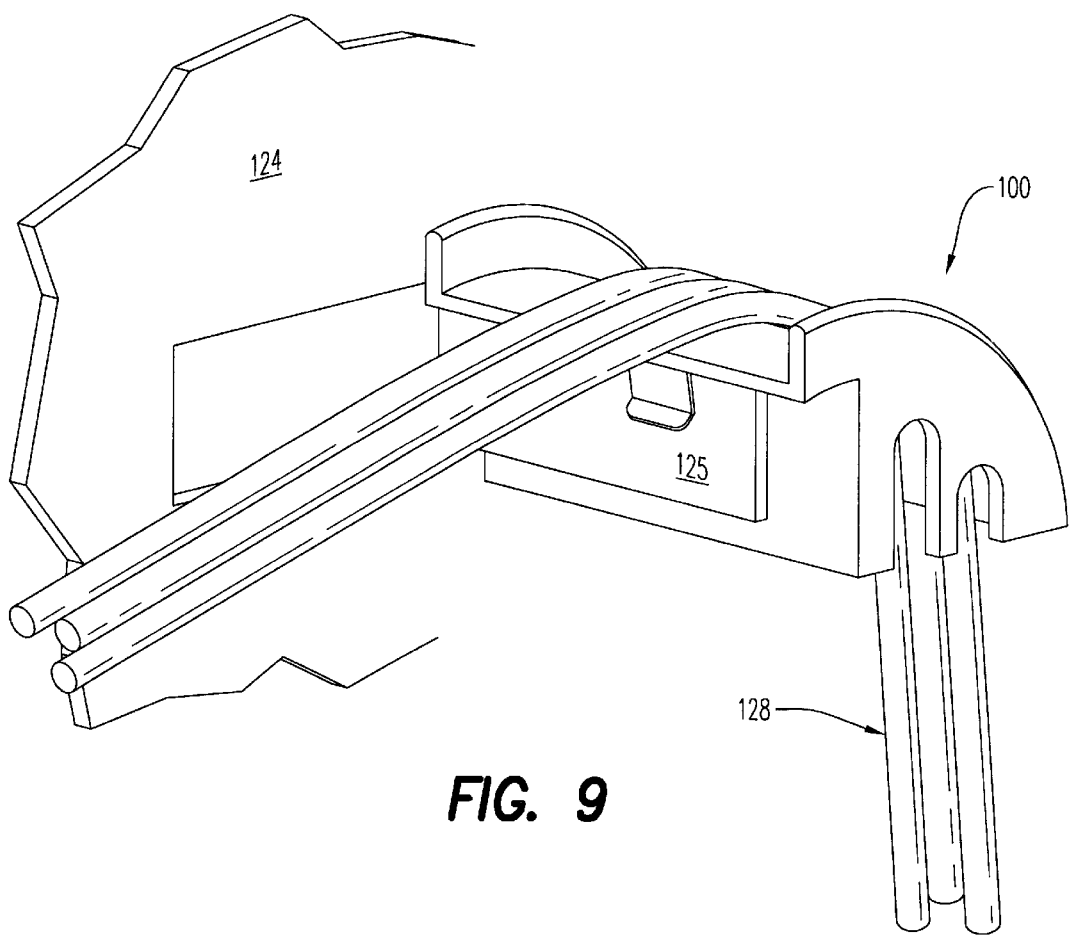
FIG. 9 is a perspective view of the guide of FIG. 1, attached to a panel tab and supporting several cables that are routed along the panel.

In FIG. 6, a sheet metal panel 124 is provided from which tab 125 has been punched and bent so as to lie on a plane perpendicular to the surface of the panel. The clip is lowered over the upper edge. 127 of the tab and grasps the tab firmly. Now, as shown in FIG. 9, cables 128 are routed from below the guide and passed over and supported by the guide in a way that ensures that they cannot be bent so sharply as to damage them or their optical performance for the same aforementioned reason.

Figure 7:
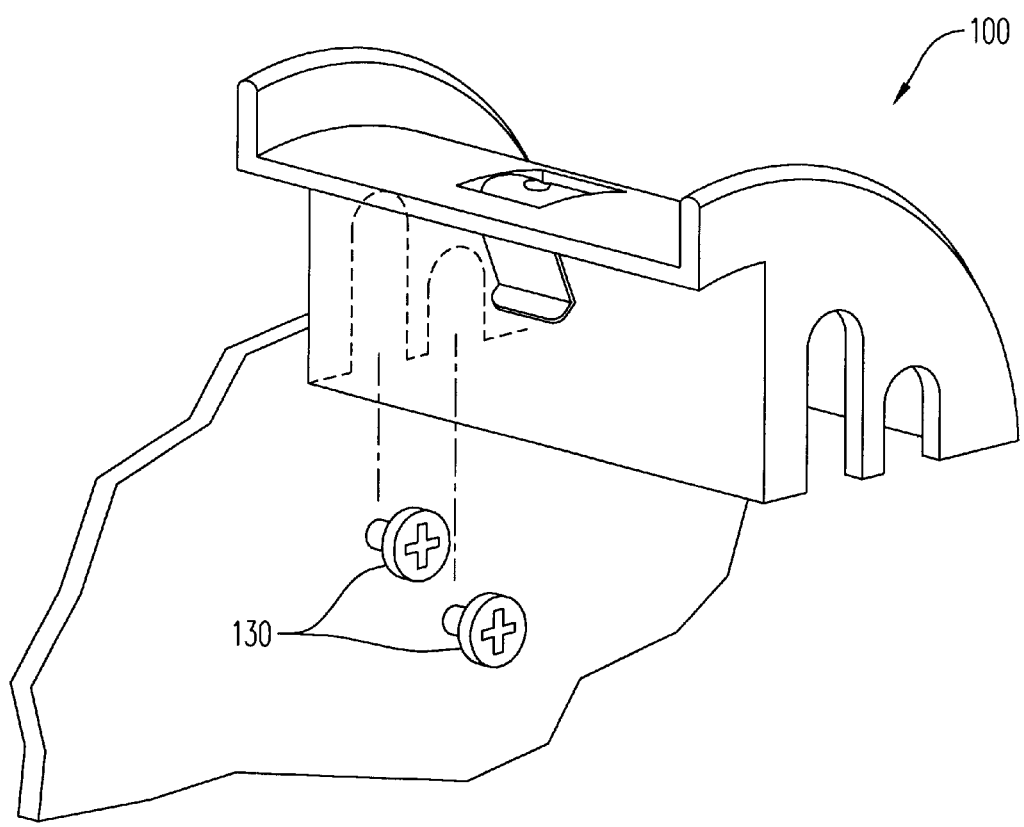
FIG. 7 is an exploded perspective view of the guide of FIG. 1 being attached to a panel by screws.

FIG. 7 depicts an alternate mode of attaching the guide to a panel by screws 130, when the punching and bending of a tab is not practical.

Figure 10:
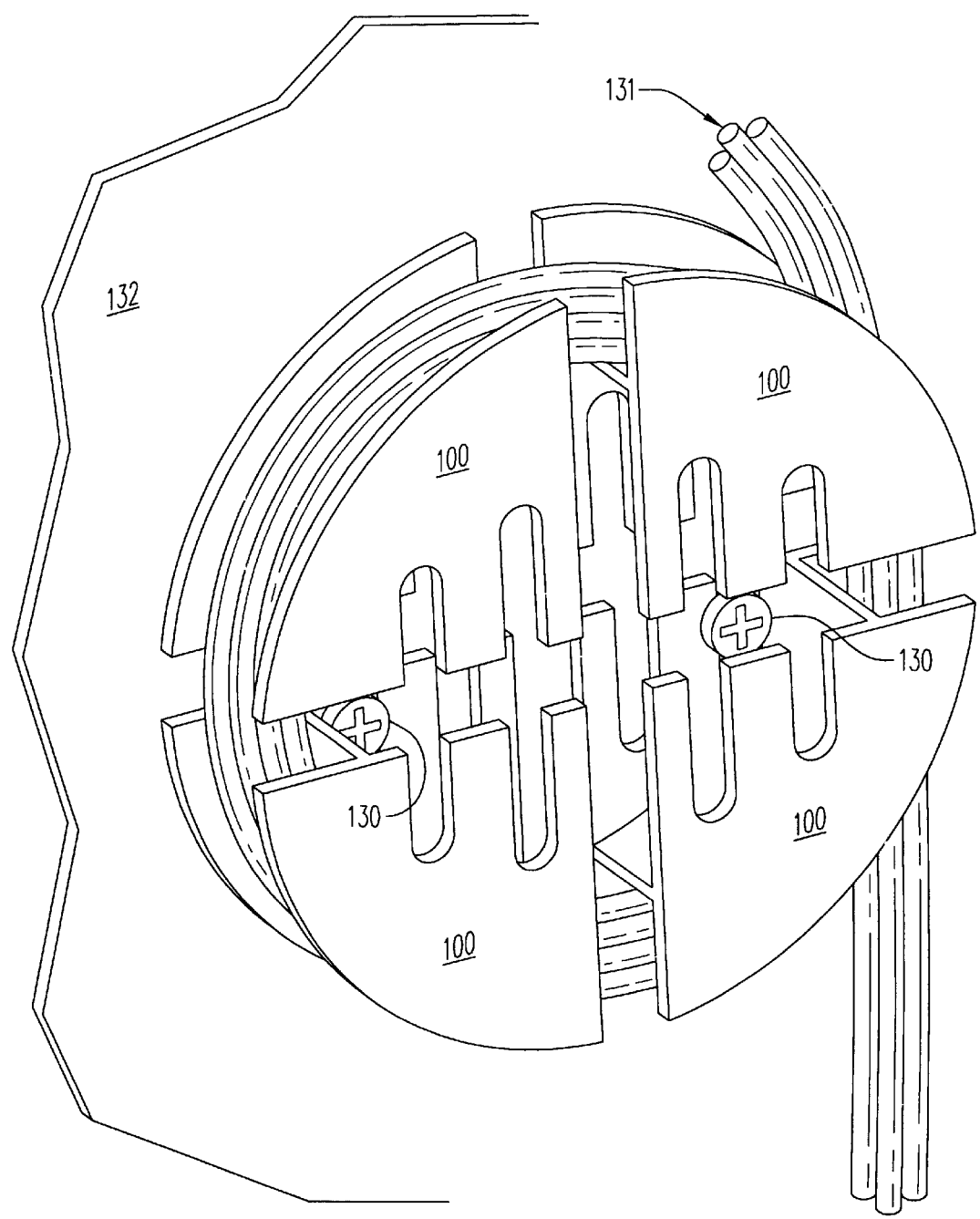
FIG. 10 is a perspective view of a group of four of the guides of FIG. 1 arranged to form a cable storage spool and supporting a coil of stored cable.
Figure 11:
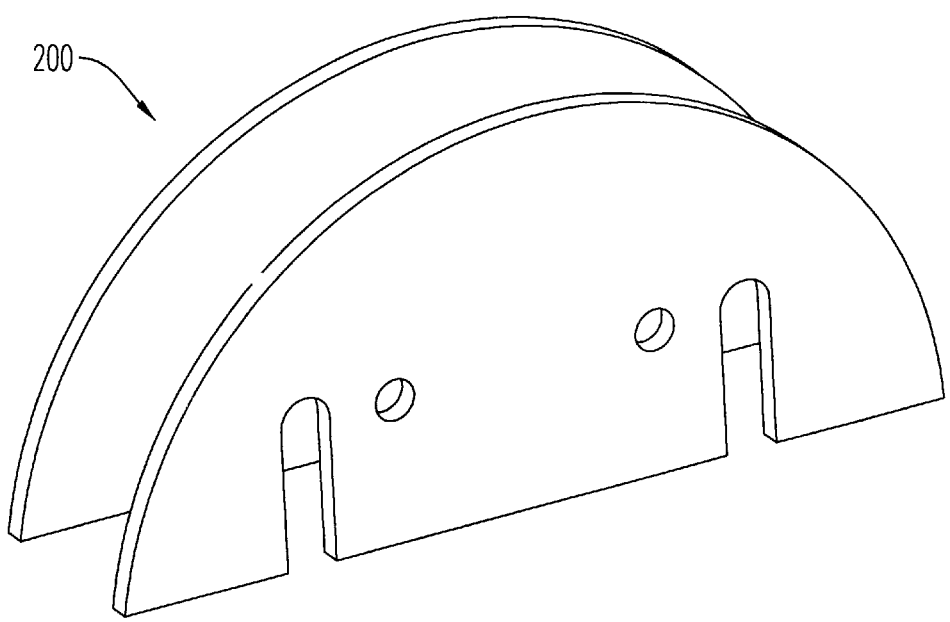
FIG. 11 is a perspective view of a guide according to a secondary embodiment of the invention.
Figure 12:
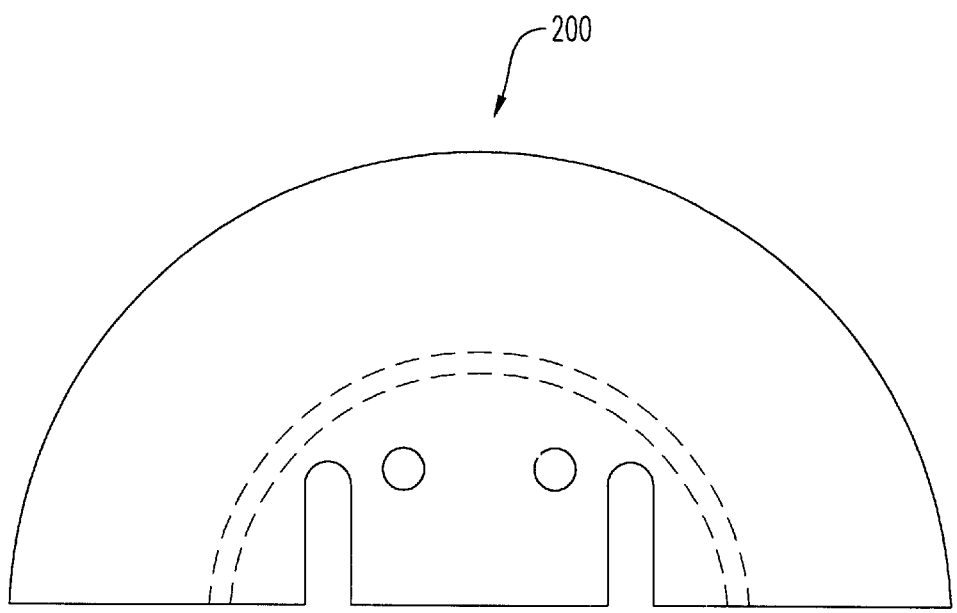
FIG. 12 is a side view of the guide of FIG. 11.
Figure 13:
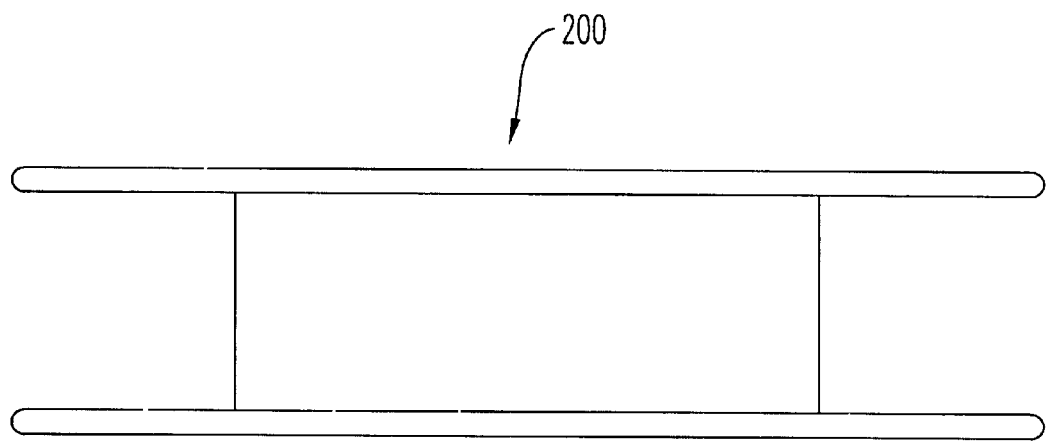
FIG. 13 is a top view of the guide of FIG. 11.
Figure 14:
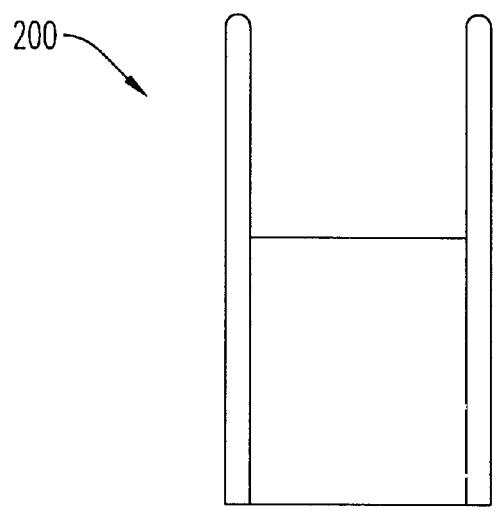
FIG. 14 is an end view of the guide of FIG. 11.
Figure 15:
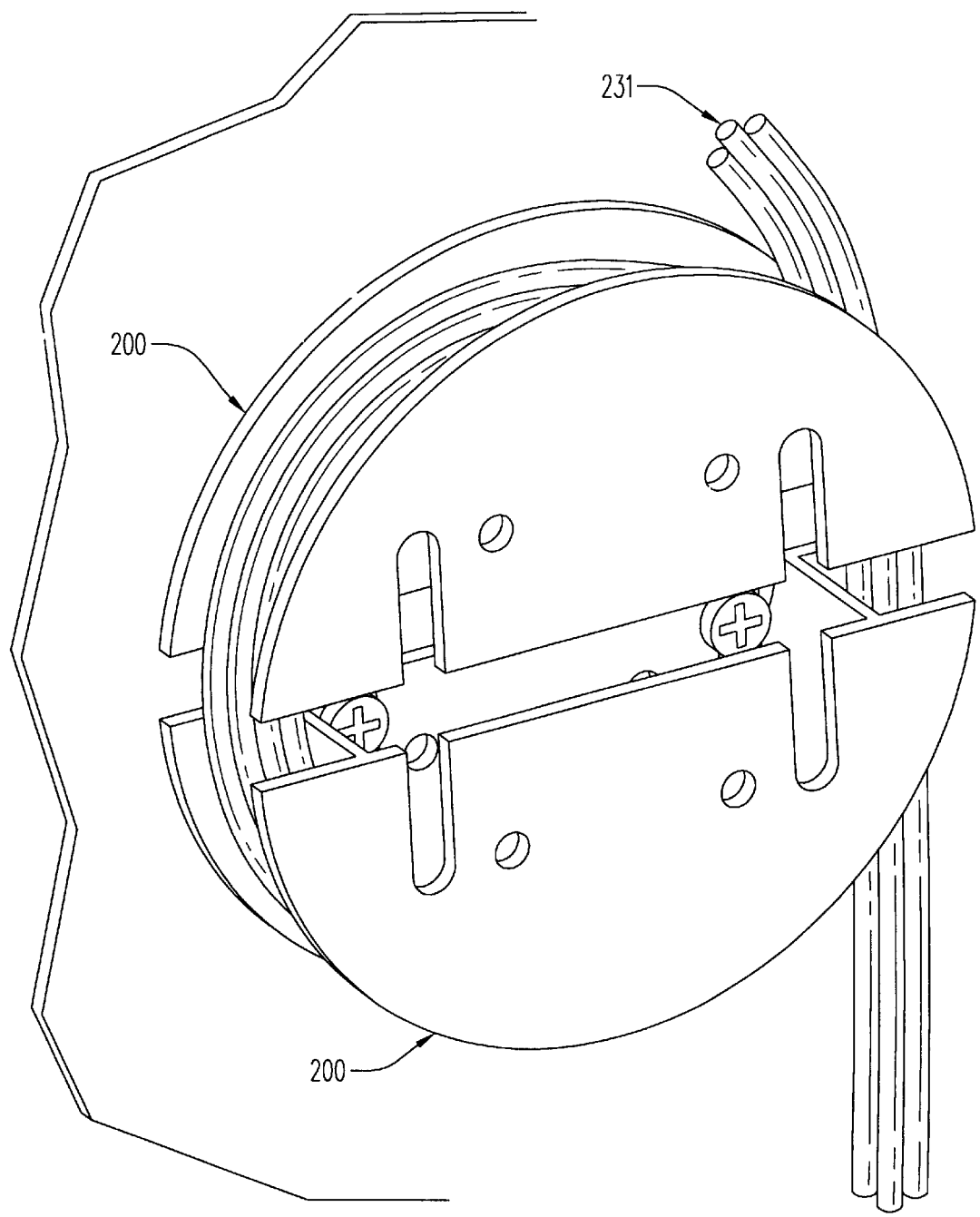
FIG. 15 is a perspective view of a pair of the guides of FIG. 11 arranged to form a cable storage spool and supporting a coil of stored cable.

In FIG. 10, four of the guides are arranged to form a cable storage spool with each guide being secured to a panel 132 with the screws as in FIG. 7. Surplus cable 131 is then coiled around the spool to ensure an adequate coil bend radius is maintained.

A secondary embodiment 200 of the invention is depicted in FIGS. 11 through 15. This embodiment is only intended for mounting on a panel with screws as was the first embodiment shown in FIG. 7, and to support cables that are routed along the panel surface. Alternately, it is used in combination with another of the same to form a spool for storage of excess cable 231, similar to the use of the first embodiment depicted in FIG. 10.

It should be appreciated by those skilled in the art that the disclosed is simply the preferred of many possible embodiments of the invention, and therefore, the scope of the invention should only be limited by the following claims.

What is claimed is:

1. a guide for placement at a hole through a panel and for limiting the bend radius of a fiber optic cable routed through said hole to a size greater than a given cable bend radius, said guide comprising:

a guide surface having a radius of curvature which is not less than said given cable bend radius, said guide surface having an axis of curvature; and spring clip means for affixing said guide to a rectilinear edge of said hole such that said guide surface is parallel to said edge.

2. the guide of claim 1 further comprising alternate means for affixing said guide to said panel such that said axis of curvature is normal to said panel.

3. The guide of claim 2 wherein said alternate means is said clip and is adapted for affixing to said panel by grasping an edge of a protrusion of said panel, said protrusion extending from and normal to said panel.

4. The guide of claim 2, wherein said alternate means is at least one screw-hole through said guide and adapted to allow a screw to pass therethrough and into said panel to secure said guide to said panel.

5. A guide for affixing to a panel to limit the bend radius of a fiber optic cable, said guide adapted for placement at a hole through said panel to limit said bend radius of cable routed through said hole to a size greater than a given cable bend radius, or alternately for placement on said panel for guiding cable that is routed parallel to said panel while limiting said bend radius of said cable around said guide to a size greater than said given cable bend radius, said guide comprising:

a guide surface having a radius of curvature which is not less than said given cable bend radius, and said guide surface having an axis of curvature;

primary means for affixing said guide to said panel adjacent to an edge of said hole that said guide surface is tangent at said panel to a line normal to said panel and passing through said hole and said axis of curvature is on a plane parallel to said panel, said primary means comprising a clip for grasping said panel at said edge of said hole;

secondary means for alternately affixing said guide to said panel such that said axis of curvature is normal to said panel, said secondary means also comprises said clip and said clip is adapted for affixing to said panel by grasping an edge of a protrusion of said panel, said protrusion extending from and normal to said panel; and alternate secondary means comprising at least one screw hole through said guide and adapted to allow a screw to pass therethrough and into said panel to secure said guide to said panel.

6. A guide according to claim 1 wherein said guide further comprises a wall projecting inwardly from said guide surface and arranged to engage one side of said panel adjacent to said hole, and said guide surface defines a slot intersecting said wall and providing access of said clip into engagement of said panel to said wall.

7. A guide according to claim 6 wherein said guide surface comprises a lip portion extending past said wall and arranged to cover said edge.

8. A guide according to claim 7 wherein said wall projects radially from said guide surface.

9. A guide according to claim 8 wherein said guide is adapted for fixing to said panel such that said guide surface is substantially tangent at said panel to a line normal to said panel and passing through said hole.

10. The guide of claim 9 further comprising alternate means for affixing said guide to said panel such that said axis of curvature is normal to said panel.

11. The guide of claim 10 wherein said alternate means is said clip and is adapted for affixing to said panel by grasping an edge of a protrusion of said panel, said protrusion extending from and normal to said panel.

12. The guide of claim 10 wherein said alternate means is at least one screw-hole through said guide and adapted to allow a screw to pass therethrough and into said panel to secure said guide to said panel.

13. A guide for placement at a hole through a panel and for limiting the bend radius of a fiber optic cable routed through said hole to a size greater than a given cable bend radius, while also protecting said cable from an edge of said hole, said guide comprising:

a guide surface having a radius of curvature that is not less than said given cable bend radius, said guide surface having an axis of curvature;

means for affixing said guide to said panel adjacent to an edge of said hole such that said axis of curvature is on a plane parallel to said panel and said guide surface is substantially tangent at said panel to a line normal to said panel and passing through said hole distant from said edge, and wherein said guide surface extends through said hole between said line and said edge such that said cable cannot touch said edge.

14. The guide of claim 13 wherein said means for affixing comprises a clip for grasping said edge.

15. The guide of claim 14, further comprising alternate means for affixing said guide to said panel such that said axis of curvature is normal to said panel.

16. The guide of claim 15, wherein said alternate means is said clip and said clip is adapted for affixing to said panel by grasping an edge of a protrusion of said panel.

17. The guide of claim 15 wherein said alternate means is at least one screw-hole through said guide and adapted to allow a screw to pass therethrough and into said panel to secure said guide to said panel.

18. A guide for affixing to a panel to limit the bend radius of a fiber optic cable, said guide adapted for placement at a hole through said panel to limit said bend radius of cable routed through said hole to a size greater than a given cable bend radius, or alternately for placement on said panel for guiding cable that is routed parallel to said panel while limiting said bend radius of said cable around said guide to a size greater than said given cable bend radius, said guide comprising:

a guide surface having a radius of curvature which is not less than said given cable bend radius and said guide surface having an axis of curvature;

primary means for affixing said guide to said panel adjacent to an edge of said hole such that said guide surface is tangent at said panel to a line normal to said panel and passing through said hole and said axis of curvature is on a plane parallel to said panel; and secondary means for alternately affixing said guide to said panel such that said axis of curvature is normal to said panel.

19. The guide of claim 18 wherein said primary means comprises a clip for grasping said edge of said hole.

20. The guide of claim 19, wherein said secondary means also comprises said clip and said clip is adapted for affixing to said panel by grasping an edge of a protrusion of said panel, said protrusion extending from and normal to said panel.

21. The guide of claim 20 further comprising alternate secondary means comprising at least one screw hole through said guide and adapted to allow a screw to pass therethrough and into said panel to secure said guide to said panel.

* * * * *